United States Patent [19]
Harada

[11] 3,877,566
[45] Apr. 15, 1975

[54] CHAIN CONVEYOR OF SWING-STIRRUP TYPE

[75] Inventor: Motomu Harada, Tokyo, Japan

[73] Assignee: Nippon Suisan Kabushiki Kaisha, Tokyo-to, Japan

[22] Filed: Oct. 24, 1972

[21] Appl. No.: 300,255

[30] Foreign Application Priority Data
| | | |
|---|---|---|
| Oct. 26, 1971 | Japan | 46-81931 |
| Aug. 25, 1972 | Japan | 47-84454 |
| Aug. 25, 1972 | Japan | 47-84455 |
| Aug. 25, 1972 | Japan | 47-99214[U] |
| Aug. 25, 1972 | Japan | 47-99215[U] |
| Aug. 25, 1972 | Japan | 47-99216[U] |
| Aug. 25, 1972 | Japan | 47-99217[U] |
| Aug. 25, 1972 | Japan | 47-99218[U] |

[52] U.S. Cl. ............................................... 198/160
[51] Int. Cl. ................................................. B65g 19/00
[58] Field of Search .................... 198/129, 137, 160; 214/707, 708, 709, 710

[56] References Cited
UNITED STATES PATENTS
| | | | |
|---|---|---|---|
| 2,935,367 | 5/1960 | Crawford | 198/158 X |
| 3,196,811 | 7/1965 | Lefever | 198/137 |

FOREIGN PATENTS OR APPLICATIONS
| | | | |
|---|---|---|---|
| 104,681 | 5/1969 | Netherlands | 214/707 |

*Primary Examiner*—Evon C. Blunk
*Assistant Examiner*—Douglas D. Watts
*Attorney, Agent, or Firm*—Wenderoth, Lind & Ponack

[57] ABSTRACT

A chain conveyor has parallel lateral chains and swing stirrups suspended swingably therebetween at specific intervals therealong and constituting transverse members for bearing conveyed loads, the swingable nature of the transverse swing stirrups affording great versatility to a conveyor system incorporating this swing-stirrup conveyor, whereby conveyed articles can be positively conveyed in horizontal, inclined, vertical, and even overhead or inverted parts of the conveyor path and can be readily loaded onto and unloaded from the conveyor at any of these path parts.

20 Claims, 31 Drawing Figures

FIG. 5(a₁)

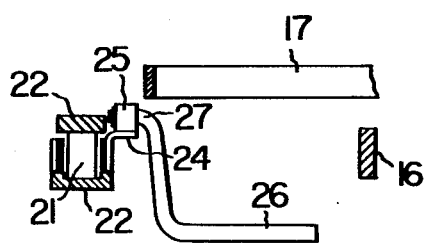
FIG. 8
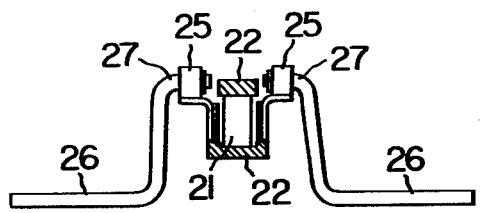
FIG. 9
FIG. 10
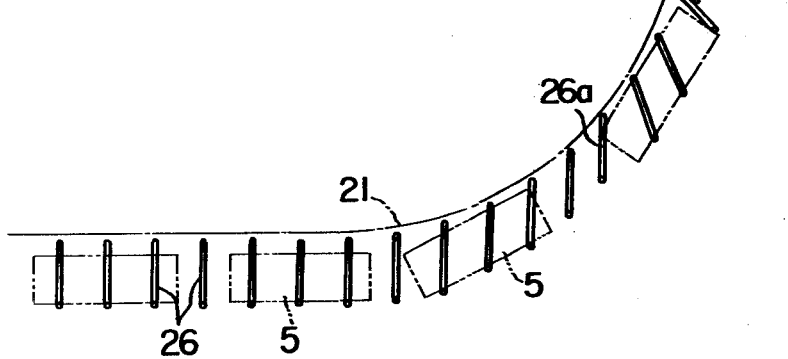

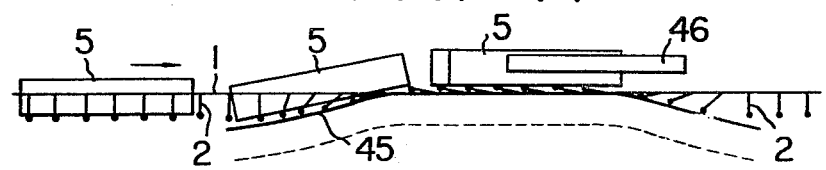
FIG. 16(a)
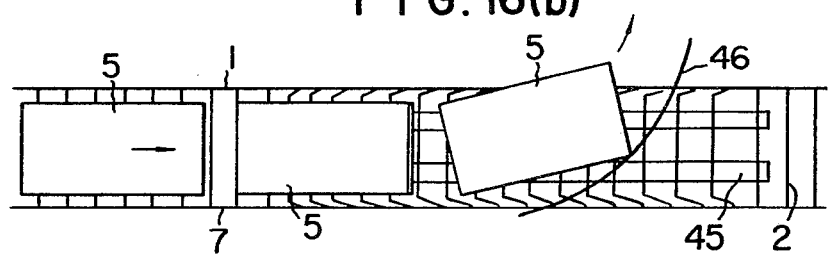
FIG. 16(b)
FIG. 17(a)   FIG. 17(b)   FIG. 18
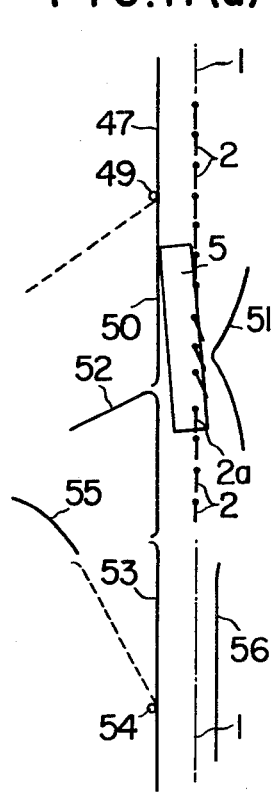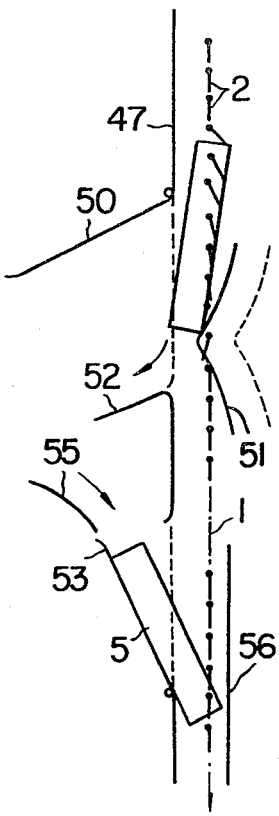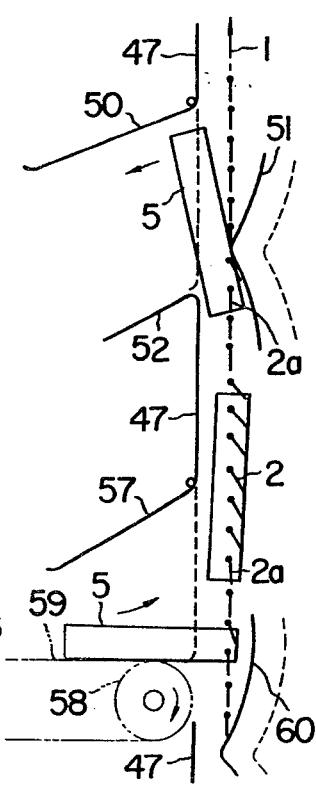

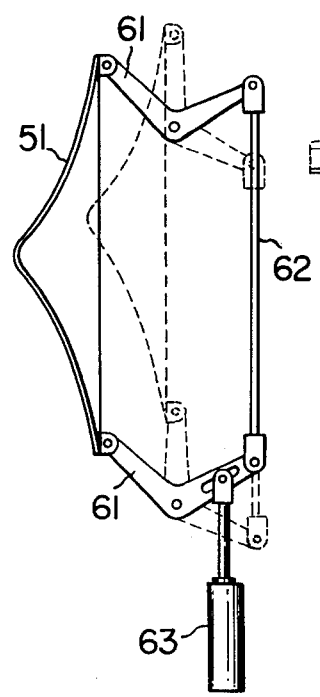
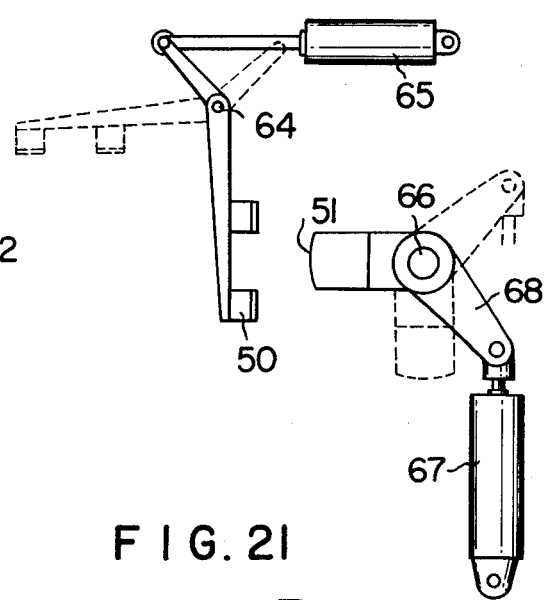
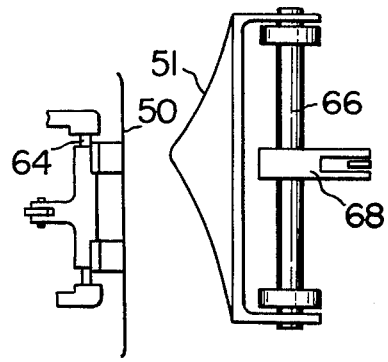
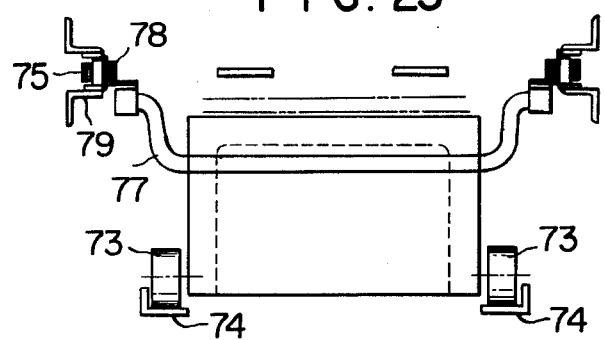

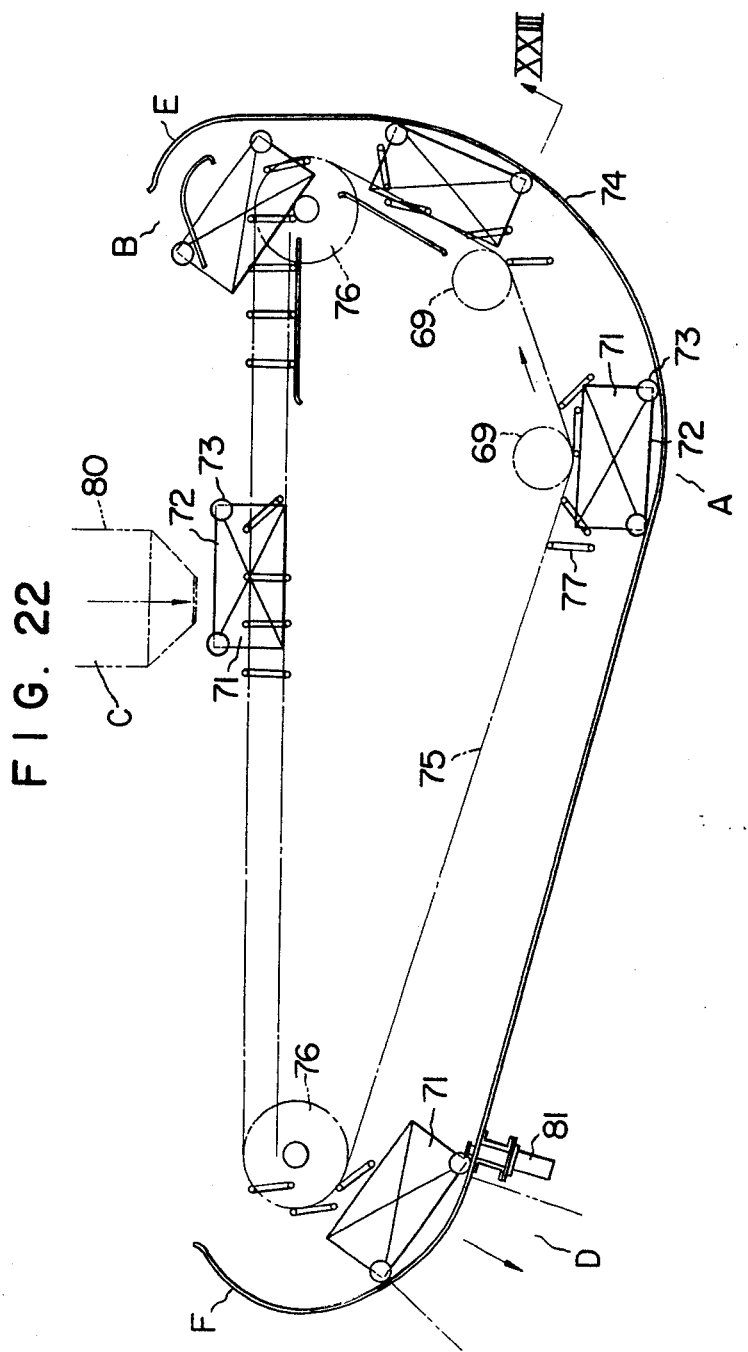

CHAIN CONVEYOR OF SWING-STIRRUP TYPE

BACKGROUND

This invention relates generally to techniques in and apparatus for conveying articles. More particularly, the invention relates to a chain conveyor of a swinging stirrup type adapted to accomplish various kinds of transport and handling actions with respect to articles, particularly box-like articles, from horizontal transport, through inclined transport and vertical transport, to even overhead transport.

For transporting box-like articles on conveyors, particularly in instances where vertical transport is necessary, tray-conveyor systems, bucket-conveyor systems, and shelf-elevator systems have heretofore been used. In general, however, these systems are of a complicated mechanism, and the external dimensions of the apparatus tend to become large relative to the articles being conveyed. The transporting capacity of these systems is low, and mechanisms for loading and unloading of the articles being conveyed are complicated. Furthermore, a synchronicing device is required to effect accurate timing of loading of the articles onto the shelves in systems where shelves are employed.

SUMMARY

It is an object of this invention to provide an advanced chain conveyor of simple structure yet high performance in which various problems as described above are solved.

According to this invention in a basic aspect thereof, briefly summarized, there is provided a chain-conveyor system having at least one swing-stirrup conveyor comprising at least one chain, a plurality of sprocket wheels for supporting, driving, and guiding the chain passed therearound, a plurality of swing stirrups each having at least one pivotal shaft part rotatably supported on the chain thereby to permit the swing stirrup to swing freely about a horizontal axis and having a transverse load-bearing part disposed at a height level below the pivotal part of the freely swinging stirrup, said stirrups being thus mounted at spaced-apart positions on and along the chain, the at least one chain and plurality of swing stirrups constituting the conveyor proper of the system, and article-guiding means for guiding conveyed articles being moved by the conveyor at horizontal, inclined, vertical, and other parts of the conveyor path.

According to this invention in further aspect thereof, there are further provided chain guide means for further guiding and supporting the chain, loading means for loading articles to be conveyed onto the conveyor, unloading means for unloading conveyed articles off the conveyor, transfer means for transferring conveyed articles from one vertically traveling swing-stirrup conveyor to another, swing stirrups of elastic character to absorb impact loads and protect conveyed articles from damage, and a swing-stirrup conveyor combined with a plurality of material-transporting trolleys to convey dumpable material from one place to another.

The nature and further features of this invention will be apparent from the following detailed description with respect to preferred embodiments of the invention when read in conjunction with the accompanying drawings, in which like parts are designated by like reference numerals.

DRAWINGS

Figures 1, 2:
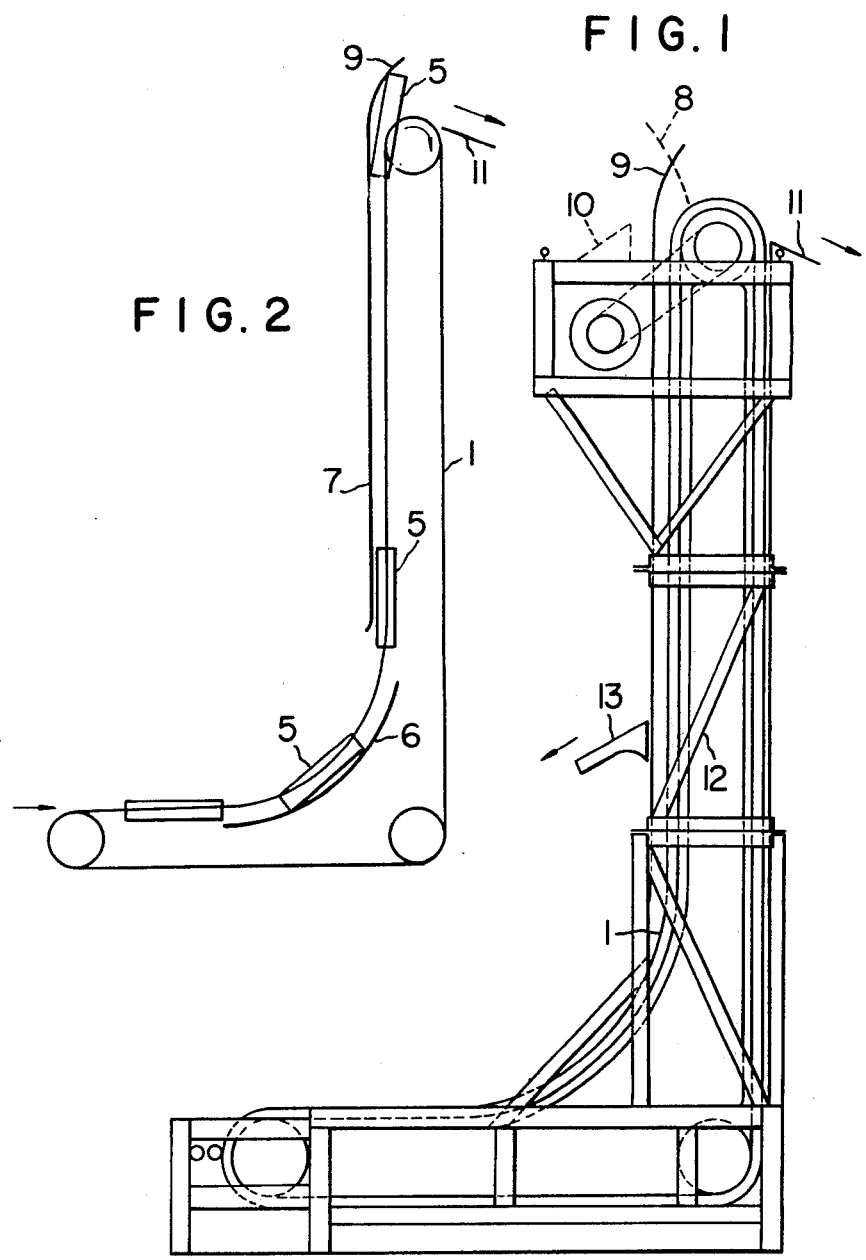
FIG. 1 is a side elevation view showing the basic type of the swing-stirrup conveyor according to this invention.
FIG. 2 is a diagrammatic elevated view for a description of the operation of the conveyor shown in FIG. 1.
Figure 3:
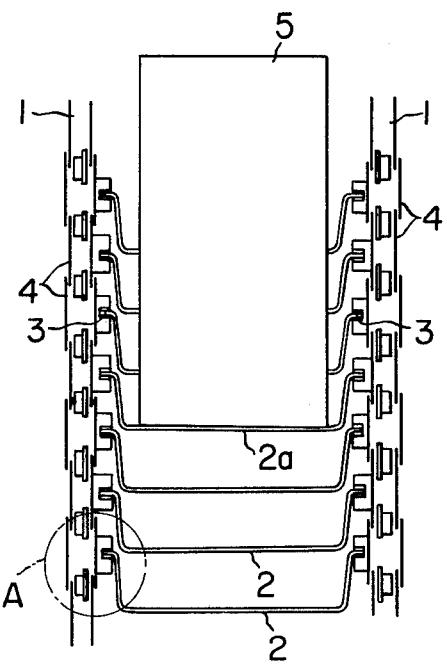
FIG. 3 is a relatively enlarged front elevation view showing the vertical portion of the same conveyor.
Figure 5A:
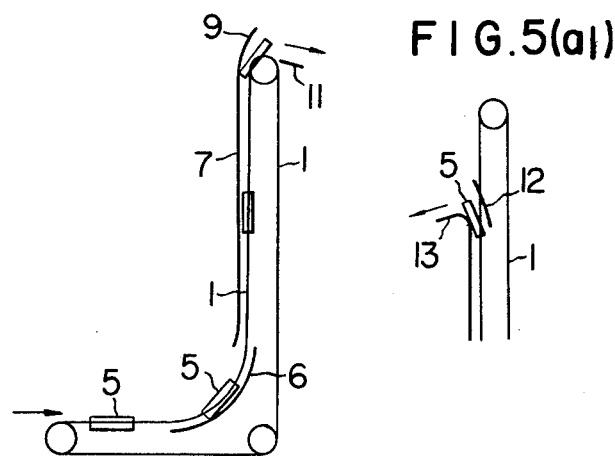
Figure 4:
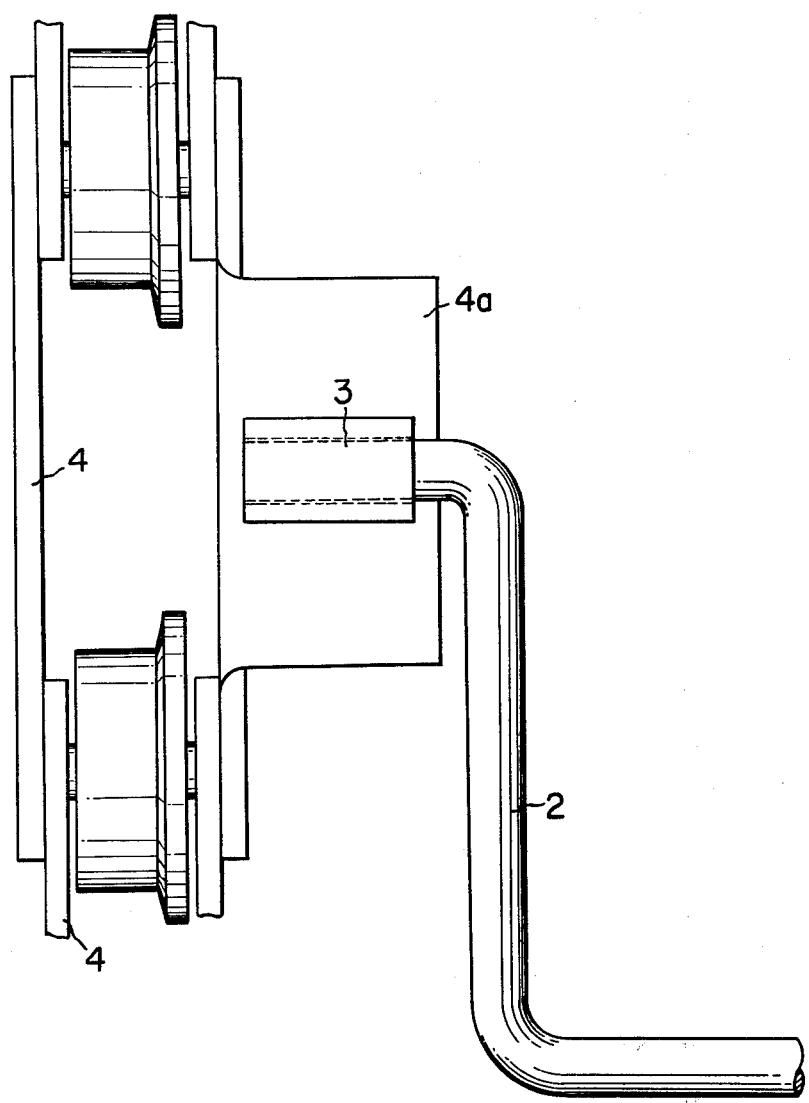
FIG. 4 is a further enlarged front elevation of the portion designated by reference character A in FIG. 3.
Figure 7:
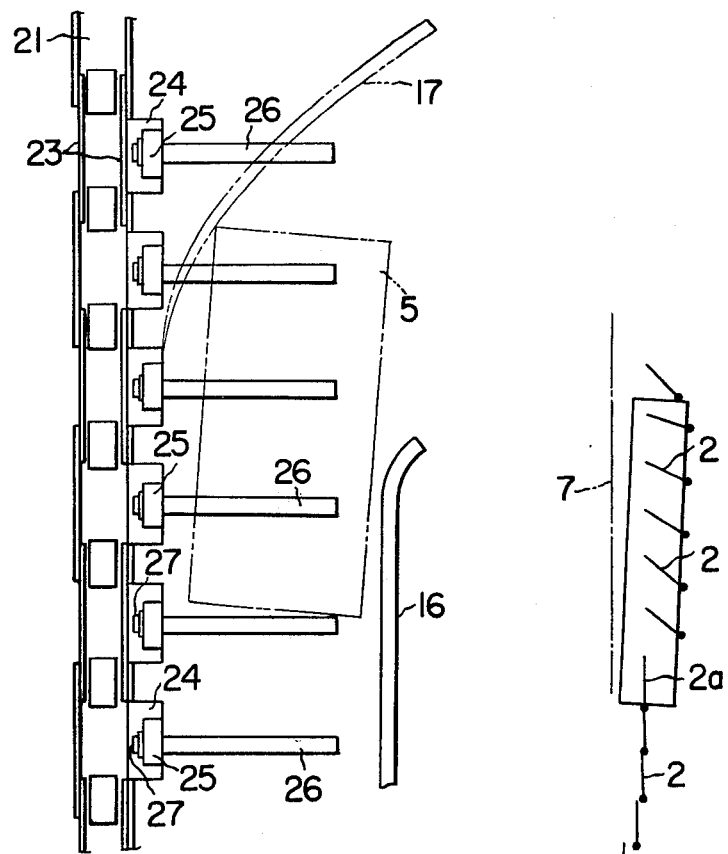
Figure 6:
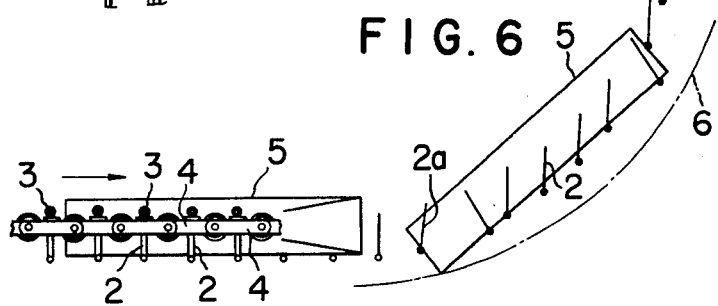
Figure 11:
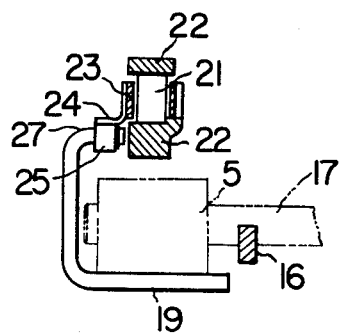
Figure 12:
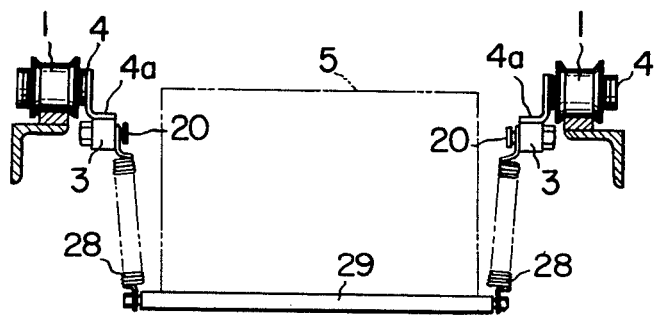
Figure 13:
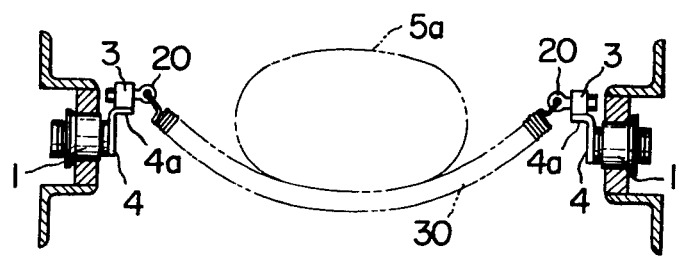
Figure 15:
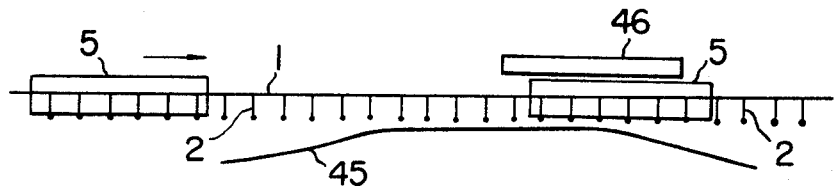
Figure 14:
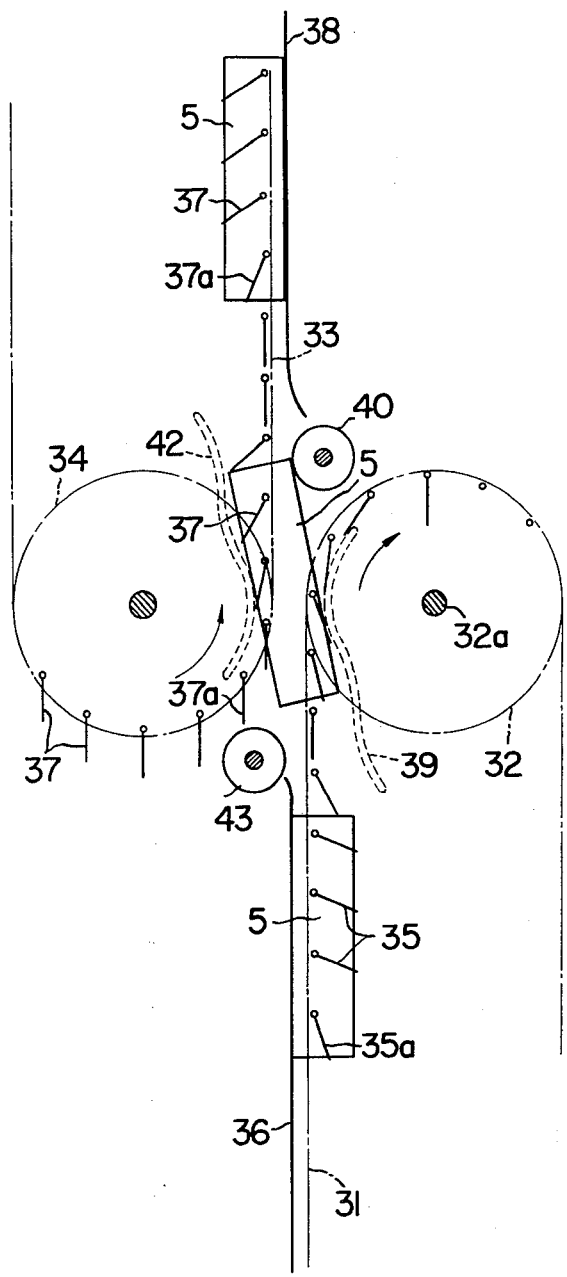

FIGS. 5(a) and 5(a1) are diagrammatic side elevation views showing basic types of means for unloading conveyed articles from a conveyor as shown in FIGS. 1, 2, and 3;

FIGS. 5(b) through 5(f), inclusive, are diagrammatic side elevation views showing examples of applications and adaptations of the swing-stirrup conveyor of the invention to various conveying paths and situations;

FIG. 6 is a side elevation view, partly in diagrammatic form, indicating the relationship of the swing-stirrup conveyor to conveyed articles;

FIG. 7 is a top plan view showing one example of a swing-stirrup conveyor of the invention in which only one chain is used to rotatably support one end of each of a plurality of swing stirrups;

FIG. 8 is a cross-sectional view of the conveyor shown in FIG. 7;

FIG. 9 is a cross-sectional view showing a modification of the conveyor shown in FIGS. 7 and 8 wherein two rows of swing stirrups are swingably supported on opposite lateral sides of a single chain;

FIG. 10 is a side elevation view indicating the manner in which articles are conveyed by the conveyor shown in FIGS. 7 and 8 at horizontal, upwardly curved, and vertical parts thereof;

FIG. 11 is a cross-sectional view showing showing still another example of a conveyor comprising a single chain and swing stirrup each of a shape wherein the load-bearing part thereof is below the chain;

FIGS. 12 and 13 are cross-sectional views showing examples of conveyors with swing stirrups of elastic, shock-absorbing construction;

FIG. 14 is a diagrammatic side elevation view showing one example of means for transferring conveyed articles from one end of one vertical swing-stirrup conveyor to another;

FIG. 15 is a diagrammatic side elevation view showing one example of unloading means for a horizontal part of the swing-stirrup conveyor, the unloading means being in retracted or inoperative state;

FIGS. 16(a) and 16(b) are respectively, diagrammatic side elevational and top plan views of the unloading means shown in FIG. 15 in operative state;

FIGS. 17(a) and 17(b) are diagrammatic side elevation views showing means for loading and unloading conveyed articles onto and from a vertical path part of the swing-stirrup conveyor and respectively showing the inoperative (pass-by) and the unloading and loading states for downward conveyor travel;

FIG. 18 is a diagrammatic side elevation view showing the transfer of conveyed articles from a horizontal conveyor to a vertical swing-stirrup conveyor traveling upward;

FIG. 19 is a side elevation showing one example of a mechanism for actuating a movable guide plate in the loading and unloading means illustrated in FIGS. 17(a), 17(b), and 18;

FIGS. 20 and 21 are respectively a plan view and a side elevation view showing another example of a mechanism for actuating the movable guide plate and a mechanism for actuating a corresponding gate in the loading and unloading means shown in FIGS. 17(a), 17(b), and 18;

FIG. 22 is a side elevation view showing an example of the swing-stirrup conveyor combined with a trolley system for loading and dumping of dumpable materials; and FIG. 23 is a cross-sectional view of the lower part of the apparatus illustrated in FIG. 22.

DETAILED DESCRIPTION

In the example of the chain conveyor illustrated in the drawings, there are provide two endless chains 1, 1 which are mutually parallel and spaced apart in the transverse direction and which, in the example shown in FIGS. 1 through 5, travel along a path which includes vertical ascending and descending portions wherein the chains are guided to travel along two parallel, vertical planes. The chain path also includes an appropriately curved portion between a horizontal portion and the vertical ascending portion. The endless chains 1, 1 are joined by a plurality of swing stirrup 2 disposed transversely to the chains and rotatably supported thereon at equal intervals in the chain travel direction.

Each swing stirrup 2 is a round bar bent with 90-degree bends at four points thereof to form a crank-like structure of flat-bottomed U-shape with coaxial, outwardly directed ends. These ends are rotatably supported by pivotal bearings 3 mounted on flanges 4a extending from chain links 4 of respective chains 1, 1. The stirrups 2 may be thus supported at every chain link 4 or at greater intervals in the travel direction. These swing stirrups 2, endless chains 1, 1, guide rollers, and guide members as described hereinafter constitute the essential parts of the chain conveyor according to this invention.

Because of the eccentric shape of each swing stirrup 2 with a center of gravity offset from the pivotal axis, each swing stirrup normally hangs vertically at all parts of the chain travel path. In the horizontal part of the conveyor travel path, the swing stirrups are hanging downward and parallelly and thus from a narrow channel-like basket. When a conveyed article 5 is loaded on the bottom of this basket, it is conveyed in a similar manner as it would be on a slat conveyor. In the case of the instant swing stirrups 2, however, side guide walls for preventing transverse shifting or spilling of the conveyed article 5 are unnecessary since the vertical parts of the stirrups, in combination, from side aprons.

As mentioned above, the swing stirrups 2 hang vertically and, therefore, are normally perpendicular to the chains 1, 1 in their horizontal path. Then, in the curved transition part of the chain path from the horizontal to the vertical, the swing stirrups, still tending to hang vertically, swing obliquely relative to the chains as shown in FIG. 6. In the vertical part of the chain path, the lateral vertical parts of the stirrups become parallel to the chains, and the stirrups and chains lie in substantially the same plane.

As the conveyed article 5 is carried along the above described path, it is lifted at its forward end with increasing angle of inclination until, finally, it would slip backward if it were not for a unique feature of this invention. That is, as the article 5 is thus lifted at its forward end, its rear surface is positively caught by the immediately following stirrup 2a. In this state, the article 5 is carried and lifted to the vertical part of the conveyor path.

Under certain conditions, the above mentioned stirrup 2a may slip off or fail to catch the article 5, which would then slip downward between and past the nearest stirrups and drop. This escape of the article 5 is prevented by the provision of a concave curve guide 6 below the curved part of the conveyor path. However, in most instances, when the immediately following stirrup 2a fails to catch the article 5 positively, the succeeding stirrup catches the article.

In this manner, the artcle 5 reaches the lower part of the vertical path part, where a vertical guide 7 is provided on the outer side (left side as viewed in FIGS. 1 and 2) of the conveyor path. The conveyed article 5, riding on the stirrup 2a by which it is caught, is thus lifted, sliding along the guide 7 and prevented thereby from separating from the conveyor or leaning against the accompanying group of swing stirrups.

At the upper end of the vertical path part, the chains 1, 1 pass over and around a sprocket to reverse their path direction and descend. At this upper turn-around part, the conveyed article 5 assumes an upright attitude and is tipped forward or rearward by a guide 8 or 9 and then discharged through an outlet 10 or 11. The article 5 can be tipped also at an intermediate point in the vertical path part by a guide 12, as indicated in FIGS. 1 and 5(a1), in a direction for separation of the article from the conveyor path and discharged through through an outlet 13.

The foregoing description with reference to FIGS. 1, 2, 5(a), and 5(a1) relates to the basic form of the chain conveyor according to this invention. The basic structure shown in its entirety in FIG. 1 can be mounted on wheels and thereby made mobile or portable.

FIGS. 5(a) and 5(a1) illustrate the above mentioned basic form of the conveyor, while FIGS. 5(b), 5(c), 5(d), 5(e), and 5(f) illustrate examples of versatile application of embodiments of the conveyor.

Figure 5B:
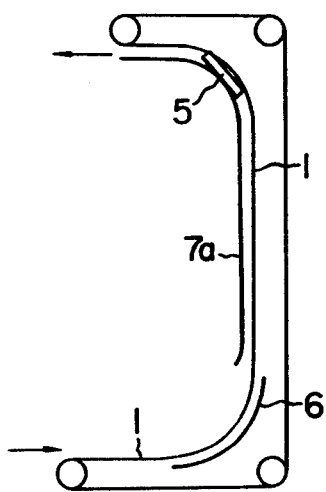

As shown in FIG. 5(b), the conveyor can be adapted to assume a C-shaped path. The vertical guide 7a at its upper part assumes a large curved bend of 90 degrees which follows the chains and is disposed therebelow. By this arrangement the conveyed article is carried along a horizontal path and then up and around without shock to a horizontal path at a higher level and discharged smoothly through an outlet in the direction opposite that of original travel.

Figure 5C:
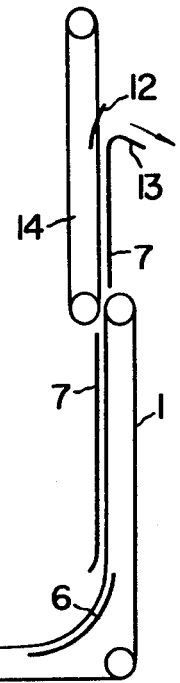

In another example of application as illustrated in FIG. 5(c), a mobile conveyor of limited height is provided with an extension for conveying articles to a high level. A swing-stirrup conveyor 14 of straight vertical spans according to this invention is so disposed that its lower end confronts the upper end of the vertical path part of a basic conveyor of this invention. Accordingly, an article conveyed up by the basic conveyor is transferred onto the conveyor 14 to be lifted to an even higher level.

Figure 5D:
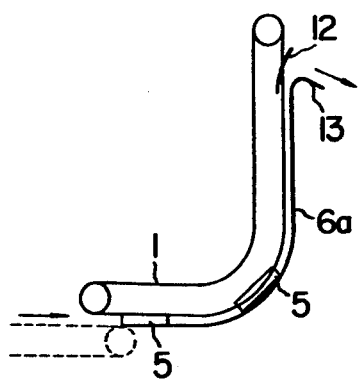

In still another application as illustrated in FIG. 5(d), the reverse side or return side of the basic conveyor is utilized to drag or sweep the conveyed article 5 along a continuous guide 6a extending along almost the entire length of the return side of the conveyor. This mode of conveyance is suitable for articles having smooth outer surfaces which are durable with respect to abrasion.

Figure 5E:
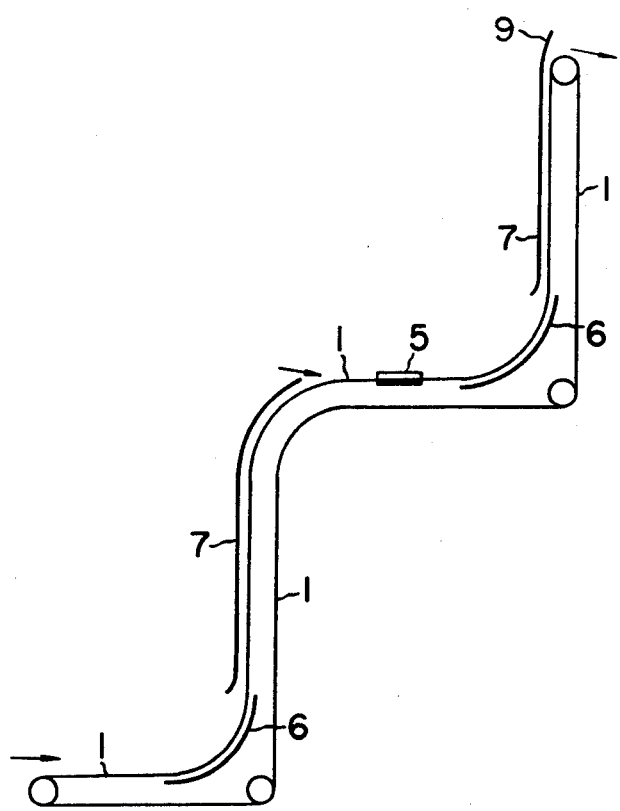

In a further example of application as illustrated in FIG. 5(e), the vertical guide 7 of the first stage is curved in the direction opposite that in the application shown in FIG. 5(b). The conveyed article 5 is thereby transported smoothly without shock along the curved part of the guide 7 and onto the horizontal part of a second stage consisting of another basic conveyor structure which forms a contiguous and integral extension from the structure of the first stage.

Articles can be also loaded onto the horizontal part of this second stage. Of course, three or more stages may be connected in the same manner.

Figure 5F:
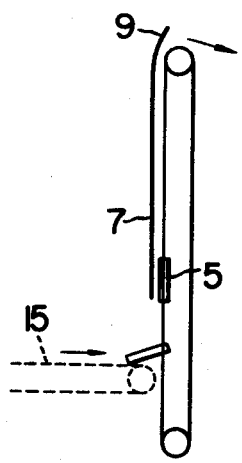

One example of a method of loading a conveyed article 5 onto a vertical part of a conveyor at a point intermediate its ends is illustrated in FIG. 5(f). As shown by the intermittent line, the downstream or discharge end of a separate, horizontal belt conveyor 15 is brought near the vertical part of the first conveyor at the loading point. In this case, the transporting capacity is reduced by 30 to 40 percent. Furthermore, since stagnation or congestion may occurs at the loading point when the conveyed articles are continuously carried hereto, it is necessary to install an accumulating conveyor at a point upstream from this loading point thereby to maintain the articles in an orderly state.

In addition to the above described applications of the swing stirrup conveyor of this invention, various other applications are possible. Moreover, various modifications can be made in the structure of the conveyor. For example, for articles to be conveyed which have weak surfaces or are packaged in soft material, the swing stirrups 2, 2 may be covered with rubber hose, or the cross-sectional shape of the transverse bottom part of each swing stirrup may be made elliptical. Furthermore, by reversing the traveling direction of this conveyor, the conveyor can be used for unloading of conveyed articles.

Certain examples of such further applications and modifications constituting further embodiments of this invention will now be described in detail.

In one example as illustrated in FIGS. 7 through 10, an endless chain 21 is guided by rails 22, 22 disposed along a required conveying path and thereby undergoes circulatory transport travel. The chain 21 is made up of a plurality of chain links 23 provided on at least one lateral side thereof with respective support flanges 24. On each flange 24, there is mounted a pivotal bearing 25 having a horizontal axis perpendicular to the direction of travel of the chain 21.

Each pivotal bearing 25 rotatably supports the pivot part 27 of a crank-shaped swing stirrup 26 made of a round bar and having two bends of substantially 90 degrees each, whereby a horizontal part extends laterally away from the chain 21. The swing stirrups 26 are thus rotatably supported on all chain links 23, 23 or at equal intervals corresponding to a number of links.

In a modification of this example, swing stirrups 26, 26 are pivotally supported on the two opposite lateral sides of the chain 21 as shown in FIG. 9.

In the swing-stirrup conveyor of the above described construction, all stirrups 26, 26 are continually urged by the force of gravity to hang freely in a vertical direction and, in combination, form a long hanging shelf extending along the path of the chain 21 and traveling therewith.

At horizontal parts or slightly sloped parts of the conveyor path, the conveyed article 5 is carried on at least two of the stirrups 26, whereby it is conveyed in the same manner as it would be on an ordinary conveyor. In this case a guide rail 16 is provided on the free end side of the stirrups 26 to prevent the articles being conveyed from falling off the stirrups.

At the steeply sloping parts or vertical parts of the conveyor path, the conveyed article 5 is prevented from sliding rearward by a stirrup 26a to the rear of the article which swings downward and catches against the rear face of the article, thereby hoisting the article upward and along the conveyor path as indicated in FIG. 10. At a sloped part of the conveyor path, the conveyed article 5 leans against the group of stirrups 26, but at a vertical part or a part of reverse slope, the article 5 would tend to tip and drop away from the conveyor. Accordingly, a guide rail 7 is provided as shown to prevent the article from separating from the stirrups 26 and to guide the article which slides therealong.

Articles 5 to be conveyed can be loaded onto the stirrups 26 in a simple manner by dropping from above or by horizontal shifting in the lateral direction from the free end side of the stirrups.

At a part of the conveyor path where the conveyed articles 5 are to be unloaded, an unloading guide 17 is installed obliquely across the conveyor path to guide the articles laterally outward toward the free end side of the stirrups 26 and onto a suitable chute or some other conveying means. At this part of the conveyor path, the guide rail 16 which would otherwise be in the way is, of course, removed. This lateral unloading can be accomplished not only at horizontal parts of the conveyor path but also at sloped parts and vertical parts. At a vertical part, the vertical guide rail 7 is cut away, and the conveyed articles are unloaded by permitting them to tip and separate away from the group of stirrups by the force of gravity or by means of an unloading guide 18 as shown in FIG. 10.

Thus, box-like articles can be conveyed easily by this conveyor operating on a single chain along a conveyor path which can be horizontal, sloped, or vertical. Accordingly, in applications where this single-chain arrangement of the swing-stirrup conveyor of this invention can be used, there is a substantial saving in installation and operational costs.

In addition, the stirrups 26 can be swingably supported on a single chain 21 on both lateral sides thereof as shown in FIG. 9, in which case, the single chain can be utilized with even greater effectiveness. By this arrangement, better balancing of weights is attainable, whereby the mechanism for preventing side tipping of the chain can be simplified.

Still another advantageous feature of this single-chain arrangement is that, by using a chain 21 which comprises links joined with flexible couplings approaching universal joints, the conveyor can be made to follow a travel path which can have not only vertical curves but also lateral curves, whereby the versatility of the conveyor is further increased.

In a modification of the above described single-chain conveyor, each swing stirrup 19 is bent inward so that its horizontal part for receiving the load of the conveyed article hangs directly below the single chain 21 and the chain rails 22, 22 as shown in FIG. 11. This arrangement, which is similar to that of a funicular car, a ski lift, or a monorail car of suspended type, is advantageous in that the resultant center of gravity of the conveyed article 5 and the stirrups 19 carrying the article is vertically below the supporting rails 22, 22, whereby the conveyor parts are not subjected to twisting and other undesirable stresses, and stable conveying operation can be carried out.

In certain applications, it is desirable that the conveyed articles be protected from impact forces. For this purpose, the swing stirrups may be modified to incorporate spring members as illustrated by two examples in FIGS. 12 and 13.

In the example shown in FIG. 12, pivotal bearings 3, 3 mounted on flanges 4a, 4a of corresponding chain links 4, 4 rotatably support short transverse shafts 20, 20. A coil tension spring 28 is connected at its upper end to the inner end of each transverse shaft 20 and at its lower end to one end of a transverse stirrup bar 29, which is supported at its other end by an identical coil spring 28.

Thus, the stirrup bar 29 is suspended at its two ends by coil springs 28, 28 from transverse shafts 20, 20 rotatably supported by corresponding conveyor chains. Accordingly, the assembly of the stirrup bar 29, the coil springs 28, 28, and transverse shafts 20, 20 constitutes a swing stirrup similar in shape and function to the swing stirrup 2 in the aforedescribed first example.

In the example shown in FIG. 13, the swing stirrup comprises a single coil tension spring 30 connected at its ends to transverse shafts 20 rotatably supported in pivotal bearings, 3, 3 mounted on the flanges 4a of chain links 4, 4 of opposed chains 1, 1. This spring stirrup 30 spans the gap between the chains 1, 1 with a sagging shape, whereby the combination of a plurality of these stirrups 30 form a concave, trough-like conveyor surface. Becuase of this shape, a conveyed article 5a placed on the conveyor is prevented from shifting or rolling thereoff in the lateral direction.

Thus, the swing stirrup 29 or 30 of the above described construction affords a cushioning of the conveyed articles 5 or 5a against impact forces since at least a part of the stirrup structure is constructed elastically. Accordingly, when the articles to be conveyed are thrown onto the conveyor, or when they slip rearward at steeply sloped or vertical parts of the conveyor path, they are protected against damage. At the same time, the chains 1, 1 and related parts are also protected from violent shock loads.

Furthermore, the elastic force with which these stirrups hold the conveyed articles tends to suppress rattling, vibration, and noise during the conveying operation.

In cases where two swing-stirrup conveyors according to this invention are to be joined end-to-end at a vertical part of a conveying path, an interchange junction device as illustrated by one example in FIG. 14 can be used. By this device, conveyed articles can be transferred from one conveyor to the other in a smooth manner without interruption.

In the example shown in FIG. 14, a lower vertical swing-stirrup conveyor has chains 31 each of which is passed over an upper sprocket wheel 32 and is thereafter guided around the sprocket wheel and downward or sideward. This part of the lower conveyor forms the upper extremity thereof. A second conveyor is disposed higher than the lower conveyor and has chains 33 each of which is passed around a lower sprocket wheel 34. This part of the upper second conveyor forms the lower extremity thereof.

The axes of the sprocket wheels 32 and 34 are parallel and lie substantially in the same horizontal plane. Accordingly, the circumferential parts of these sprocket wheels confront each other and are spaced apart with a suitable gap therebetween for hoisting of conveyed articles therethrough. The sprockets 32 and 34 rotate in opposite directions so that their respective chains 31 and 33 move upward in their paths through this gap.

The chains 31 and 33 swingably support swing stirrups 35 and 37, respectively, as described in the preceding examples. Guide rails 36 and 38 are provided parallel to and confronting the outer part of the conveying spans of the chains 31 and 33, respectively, similarly as described hereinbefore. At the upper extremity of the lower conveyor, there is provided a guide plate 39 disposed to one side laterally of the sprocket wheel 32 and inclined slightly toward the conveying path. Above the sprocket wheel 32 and the guide plate 39 and at the edge of the conveying path, there is provided a guide roller 40, which functions as an intermediate guide member between the upper end of the guide plate 39 and the lower end of the guide rail 38.

In the operation of these conveyors, each conveyed article 5 is hoisted by the swing stirrups 35 and particularly the last stirrup 35a of the lower conveyor along the guide rail 36 and arrives at the upper part of the lower conveyor. Then, as the article 5 leaves the upper extremity of the guide rail 36, it contacts the guide plate 39, and the forward or leading part of the article is forced toward the sprocket wheel 34, about which the chain 33 together with its stirrups 37 is traveling. The leading part of the article 5 thereby contacts the swing stirrups 37 and, forcing these stirrups successively to swing inward, travels upward.

One one hand, the swing stirrups 35, 35 at the upper extremity of the lower conveyor revolve along the periphery of the sprocket wheel 32 and thus separate away from the conveyed article 5.

The upper part of the rising article 5 along its surface which has thus separated from the transverse parts of the stirrups 35, 35 contacts the guide roller 40 and is guided thereby to the guide rail 38. By the time the lowest stirrup 5a which has been supporting the lower end of the conveyed article 5 revolves upward from the horizontal plane passing through the sprocket wheel shaft 32a, the lower end of the article is also forced toward the other sprocket wheel 34 and deeply into the space between the chains 33 of the upper conveyor. The next stirrup 37 below the lower end of the article 5 is at a position less than the thickness of the article therefrom and is revolving toward the article.

Finally, the rising speed of the above mentioned stirrup 5a decreases as this stirrup separates from the article. The conveyed article 5 also tends to slow down slightly at this point but is quickly caught at its lower end by the stirrup 37a, taking the place of the former stirrup 35a. The article 5 is thereby hoisted by the stirrup 37a while being held by other stirrups and guided by the guide rail 38. Even if there is a lag in the timing of this transfer from the stirrup 35a to the stirrup 37a, the conveyed article 5 will merely slip rearward a short distance and then, being promptly caught by the stirrup 37a, will continue to rise.

In the case where the directions of travel of the upper and lower conveyors are reversed to lower conveyed articles, the operation is the same except for reversal of the above described sequence of actions. For this purpose, a guide plate 42 and a guide roller 43 are provided in reverse symmetrical relationship to the aforedescribed guide plate 39 and guide roller 40 as shown in FIG. 14. In the case where these upper and lower conveyors are to be used for both hoisting and lowering by switching these operations, both guide plates 39 and 42 and both guide rollers 40 and 43 are installed, the spacings therebetween being selected to suit the shape and dimensions of the conveyed articles.

Thus, as described above, the vertical conveyor paths of two conveyors according to this invention can be joined for smooth, uninterrupted transfer of conveyed articles therebetween by an interchange junction device according to the invention of very simple organization requiring the additional provision of only guide plates and guide rollers. By this organization, the unique and advantageous features of the swing-stirrup conveyor of the invention in vertical conveyance are fully utilized, whereby the interchanging operation is accurate and reliable. Moreover, except for synchronizing the traveling speeds of the two conveying, there is no need for adjustment of timing.

While this vertical interchange device has been described above with respect to conveyors having swing stirraps of the type first described hereinbefore with reference to FIGS. 1 through 6, it will be apparent that this interchange device can be applied with equal effectiveness to conveyors having swing stirrups of other types such as those illustrated in FIGS. 7 and 8, FIG. 9, FIG. 11, and FIGS. 12 and 13.

As described hereinbefore, conveyed articles 5 can be easily loaded onto or unloaded from the single-chain conveyors of this invention as illustrated in FIGS. 7, 8, and 9 and in FIG. 11 in horizontal parts of their travel path. While conveyed articles 5 can be readily loaded onto the trough-like conveyor of the invention as illustrated in FIGS. 1 through 6, 12, and 13 in all parts of the conveyor path, the articles carried in the trough of the conveyor in a horizontal part thereof cannot be readily unloaded because of the side walls of the trough.

For unloading conveyed articles from a horizontal path of a swing stirrup conveyor of trough shape as described hereinbefore, there is provided, in accordance with the invention in another of its as aspects, an unloading device comprising means for successively lifting the conveyed articles to a level above the conveyor chains and means for guiding the articles laterally off the conveyor.

In one specific example of this unloading device as illustrated in FIGS. 15, 16(a), and 16(b), there is provided a guide ramp 45 disposed below and parallel to the conveyor of the invention comprising chains 1, 1 and swing stirrups 2 swingably suspended therefrom and carrying articles 5. The guide ramp 45, as viewed laterally, has the shape of a flat-topped hill with gently rising and falling slopes on the leading and trailing portions thereof.

The entire guide ramp 45 is supported on means (not shown) whereby it can be raised and lowered bodily as desired. At its lowest position, the upper flat part of this guide ramp 45 is below and fully clear of the lowest part of the hanging stirrups 2. At its highest raised position, the upper flat part is at a level whereby the articles 5 can be unloaded as described below.

In addition, a curved guide plate 46 is disposed horizontally above the upper flat part of the guide ramp 45 and at a height such that the lower edge of this guide plate 46 is above and clear of the highest part of the conveyed article 5 borne on the conveyor when the guide ramp 45 is in its lowered position. The curved guide plate 46, as viewed in plan view, is disposed to traverse diagonally across the conveyor.

Ordinarily, the guide ramp is in its lowered position, and the conveyor is traveling from left to right as viewed in FIG. 15, with the stirrups 2 hanging vertically and carrying the articles 5. When one or more articles 5 are to be unloaded, the guide ramp 45 is raised prior to the arrival of the one or first article at the leading portion of the ramp. Then, as the swing stirrups 2 successively contact the ramp 45, they are swung rearward thereby until their horizontal transverse parts are slightly above the parts of the chains 1, 1.

As the swing stirrups 2 are thus "folded" rearward and slightly upward, each article 5 carried on the horizontal transverse parts thereof is also raised and, at this height, abuts against the diagonally disposed guide plate 46, thereby being guided laterally off the conveyor to be received by a chute or some other transport means (not shown).

Thus, by this unloading device of a very simple construction as described above, the conveyed articles can be unloaded easily, smoothly, and positively. Furthermore, by removing or retracting the guide plate 46, this device can also be utilized for horizontal loading of the articles. In this case, the articles can be loaded gently without their dropping into the conveyor trough as is unavoidable in the case of conventional apron conveyors, whereby damage to the articles can be prevented.

Furthermore, by providing means for retracting the guide plate 46 out of the path of the conveyed articles 5, it is possible to unloaded and pass selectively the articles arriving on the conveyor by raising and lowering the guide ramp 45.

In claim conveyors known heretofore of the apron type, that is, with a trough-like conveyor structure, automatic unloading or picking off the conveyed articles has been difficult or troublesome, and the only practical measure has been to curve the conveyor downward at the terminal point of its conveying path thereby to discharge the article in the direction of travel. This problem is readily solved by the above described device whereby unloading (and loading) can be accomplished at any time and at any point.

Thus, the unique character of the swing stirrup of the conveyor of this invention is further utilized to great advantage by this device, while, reciprocally, the versatility of the conveyor of the invention is further increased.

The swing-stirrup conveyor of the invention in a vertical part of its path can be provided with a loading and unloading device as described below and as illustrated by FIGS. 17 through 21. In a vertical part of the conveyor path a conveyed article 5 is being hoisted principally by a stirrup 2a, which has caught the lower surface of the article, as described hereinabefore, and the article is thus caused to slide along a vertical guide rail 47.

As indicated in FIGS. 17(a), 17(b), and 18, a portion of the vertical guide rail 47 is removed, and the resulting opening is provided with a covering gate 50 hinged along its upper edge on a hinge 49 supported along the upper edge of the opening. On the side of the vertical row of swing stirrups opposite from the side of the guide rail 47 and in a position to confront the gate 50, a movable guide plate 51 of cissoidal shape in section as viewed laterally is provided, and is adapted to move toward and; away from the conveyor as described hereinafter. Below the gate 50 and in a direction away from the conveyor, there is provided an unloading guideway 52.

The guide rail 47 at another part thereof is cut away to form another opening, which can be closed and opened by a swinging chute 53 pivotally supported at its lower edge by a hinge 54 on the lower edge of the opening. A loading guideway 55 is provided above the chute 53 and oriented so as to be contiguously aligned with; the chute 53 in its fully opened state. A stationary planar guide plate 56 is disposed on the reverse side of the conveyor and at a position to confront the chute 53.

Still another gate 57, similar to the gate 50, is provided separately, and below this gate 57 and away from the conveyor, there is disposed a sprocket wheel or roller 58 for supporting one end of a horizontal conveyor 59. On the reverse side of the vertical conveyor and at a position to confront the gate 57, there is provided a guide plate having a shape similar to the upper half of the cissoidal guide plate 51 and adapted to be movable toward and away from the vertical conveyor.

The gates 50 and 57 and the chute 53 are driven in their opening and closing actions by suitable means such as those utilizing electromagnetic force and hydraulic pressure. One example of means for moving the guide plates 51 and 60 toward and away from the conveyor is illustrated in FIG. 19. The upper and lower ends of the guide plate 51 in this mechanism are pivotally supported respectively on the ends of upper and lower levers 61, 61 of substantially the same bellcrank shape pivoted at their middle parts on stationary frame part (not shown) and disposed parallelly to each other.

The guide plate 51, the arms of the levers 61, 61 supporting the guide plate 51, and the above mentioned frame part thereby form a four-bar linkage of the configuration of a parallelogram. The ends of the other arms of the levers 61, 61 are coupled by a tie rod 62 pivotally connected thereto. The outer end of the piston rod of an air cylinder 63 is coupled to one of the arms of one of the levers 61, 61, whereby the operation of this air cylinder 63 causes both levers 61, 61 to swing parallelly to impart an advancing or retracting movement to the guide plate 51.

The advancing and retracting action of the guide plate 51 can be also attained by mounting it on a structure which can be swung about a vertical axis. As shown in FIGS. 20 and 21, the gate 50 is supported along one side thereof by a vertical shaft 64 permitting the gate to swing freely. One part or an extension of the gate 50 is coupled to the piston rod of an air cylinder 65, whereby the gate is actuated by an opening and closing movement.

Similarly, the upper and lower ends of the guide plate 51 are provided with rearward extensions, the rear extremities of which are fixed to and supported by a vertical shaft 66, which is rotated in clockwise and counterclockwise directions by the piston rod of an air cylinder 67 acting through a lever 68 fixed to the shaft 66. Accordingly, the guide plate 51 is caused to swing in advancing and retracting movements.

The loading and unloading device of the above described organization according to this invention operates as follows. First, the gate 50 and the swinging chute 53 are chosed, and the guide plate 51 is placed in its retracted position. With the loading and unloading device in this state, the swing-stirrup conveyor operates normally and travels through the device, the rear or inner surfaces of the gate 50 and the chute 53 being utilized as a part of the guide rail 47. This operational state is indicated by solid line in FIG. 17(a).

Next, for unloading or loading articles from or onto the conveyor which is traveling downward, the gate 50 is opened, and the movable guide plate 51 is advanced toward and against the conveyor. Then, each conveyed article 5 supported principally by a stirrup 2a contacts the guide plate 51, being thereby deflected forward or away from the conveyor as indicated in the upper part of FIG. 17(b), and is unloaded by sliding through and dropping from the unloading guideway 52.

For loading, each article 5 arriving after sliding along the loading guideway 55 slides further onto and along the rear surface of the swing chute 53 and drops into the conveyor path, whereupon the leading end of the article 5 is caught by one (2a) of the swing stirrups of the moving conveyor as indicated in the lower part of FIG. 17(b), and the article thereby moves directly and smoothly into the normal conveying state. During this operation, the guide plate 56 functions to prevent the conveyed article 5 from escaping through the spaces between the stirrups 2 of the conveyor and, moreover, to assure positive catching of the article by the above mentioned swing stirrup 2a.

Articles 5 are unloaded from the rising vertical conveyor in the following manner. The gate 50 is opened, and the movable guide plate 51 is advanced toward the conveyor as shown in the upper part of FIG. 18. Each article 5 conveyed upward on the conveyor is deflected away from the conveyor by the guide plate 51, beginning with the leading end of the article, which thereupon tips away from the conveyor and flops onto the unloading guideway 52.

For loading articles onto the ascending vertical conveyor, the combination of the gate 57, the horizontal conveyor 59, and the movable guide plate 60 is operated in the following manner. The gate 57 is opened. Then the leading end of each conveyed article 5 arriving on the horizontal conveyor 59, as indicated in the lower part of FIG. 18, is caught by and swept upward by the stirrups 2 of the vertical conveyor, whereby the article 5 is progressively tilted up into an upright state.

At the same time, the trailing end of the article 5, still riding on the horizontal conveyor 59, moves toward the discharge extremity of this conveyor until, finally, it would drop off this extremity if it were not for the movable guide plate 60 which is advanced against the vertical conveyor to constrict the gap between the guide plate 60 and the lower extension of the guide rail 47. Since the swing stirrups 2 of the vertical conveyor are also urged toward the guide rail 47 at this part by the guide plate 60, the trailing (or lower) end of the article 5 is caught by one (2a) of these stirrups, whereby the article assumes the normal conveyed state on a vertical conveyor according to this invention.

By closing the gate 57 and retracting the guide plate 60, the vertical conveyor can be restored to its normal state for conveying either upward or downward. This restorable feature is afforded by all of the other above described loading and unloading mechanisms, that is, the gate 50 and the movable guide plate 51, and the swinging chute 53 and the stationary guide plate 56.

From the above description, it will be apparent that, because of the nature of the swing-stirrup conveyor according to the invention, loading and unloading of articles onto and from vertical parts of the conveyor traveling in eigher direction can be accomplished in a simple manner with accessory devices of extremely simple organization, which, moreover, can be restored by a simple operation to their states for normal conveyance and passage of conveyed articles past these devices.

Still another advantageous feature of these loading and unloading devices is that, because of their simple construction and their low resistance to operational movements, they can be actuated by simple means such as the hydraulic cylinders and related mechanisms described hereinbefore with reference to FIGS. 19, 20, and 21 or equivalent electromagnetic devices. Accordingly, the instant loading and unloading devices can be readily controlled by remote control during the loading, unloading, and pass-through operations of the conveyor.

In a further application of this invention as illustrated in FIGS. 22 and 23, a swing-stirrup conveyor according to the invention is adapted to function as automatic locomotive means for driving trolleys or trucks in a circulatory path to convey a material dischargeable by dumping from one point C to another point D.

As shown in FIGS. 22 and 23, each trolley 71 comprises a box-like body adapted to accommodate a material to be conveyed and having an open top 72 and wheels 3 rotatably journaled on the body near its open top 72. The wheels 3 are adapted to roll on and along two parallel guide rails 74 having a curved shape as viewed in a side view as in FIG. 22 and having inwardly curved ends E and F. These guide rails 74 thereby have the shape of a partly closed figure with an open top part.

Within this figure, there is disposed a swing-stirrup conveyor according to the invention, which comprises two endless feed chains 75 disposed in parallel and forming, as viewed in side view, a closed figure parallel for the most part to the shape of the guide rails 74, guide rails 79 for guiding the feed chains 75, sprocket wheels 76 for supporting and driving each feed chain 75 passed therearound, these sprocket wheels for each chain being at substantially the same height and disposed near respective ends of the guide rails 74, rollers 69 for causing the chains 75 at their lowest part of follow in parallel the profile of the guide rails 74, and a plurality of swing stirrups 77 swingably suspended from brackets 78 secured to the feed chains 75.

The spacing distance between the guide rails 74 and the feed chains 75 is greater than the height of the trolley 71 in the region between the dumping station D and the lowest part A of the guide rails 74 and the chains 75. This spacing distance becomes progressively smaller between the part A and the part B near the aforementioned curved end E of the guide rails 75. At the part B, the conveyor, traveling around the sprockets 76, and the curved end E are designed to operate cooperatively to invert each trolley 71 as it passes the part B so that its open top 72 is uppermost as it travels along the substantially horizontal span of the conveyor between the sprockets 76. At the other end of the conveyor, each trolley 71, riding off the conveyor, tips forward and is inverted by the curved end F of the guide rails 74.

At a loading station C intermediate the two ends of the conveyor, each trolley 71 passes under a hopper 80 disposed thereabove for supplying the material into the trolley. Immediately downstream from the station D, there is a provided a trolley stopping device 81 for arresting each trolley 71 at the dumping station D and then releasing the trolley after a predetermined time sufficient for the dumping of the material.

This stopping device 81 is operable by a suitable actuating device such as a pneumatic motor, a hydraulic motor, or an electromagnetic solenoid.

The material conveying apparatus of the above described organization according to the invention operates as follows.

The sprockets 76 are rotated by suitable motive power means (not shown) to drive the feed chains 75 in the direction indicated by the arrow, whereupon one of the swing stirrups 77 catches the rear end of a trolley 71 at the part A and causes the trolley to travel along the rails 74. As the slope of the rails 74 becomes steeper, the trolley progressively rears up into an upright position until it is inverted at the part B and then is carried on the hanging stirrups 77 with its open top 72 facing upward.

As each trolley 71 passes below the hopper 80, it is supplied with a predetermined quantity of the material and then, traveling to the end of the conveyor opposite the part F, tips over. The wheels 73, which have left the rails 74 at their end E, now reengage with the rails 74 at their end and roll downward therealong. The trolley 71, just inverted, thereby travels downward until it is stopped by the stopping device 81 at the dumping station D and there dumps the material.

Upon completion of this dumping step, the stopping device releases the trolley 71, which thereupon travels forward along the rails 74 under the force of gravity until it reaches the part A to repeat the above described cycle. The stopping device 81 assumes its trolley stopping state as soon as each trolley passes thereby.

From the above description it will be apparent that the swing-stirrup conveyor of this invention can be advantageously combined with a group of trolleys on rails to afford a conveying apparatus of very simple and low-cost construction and of trouble-free and reliable operation.

What is claimed is:

1. In a chain-conveyor system adapted for use along an article conveying path having at least one portion which is other than straight and horizontal and including driving chain means and stirrup means pivotally supported by said chain means for transferring articles, the improvements comprising: said stirrup means being comprised of a plurality of swing stirrup means pivotally positioned in parallel relationship at spaced-apart locations, adjacent swing stirrup means cooperating to support an article being conveyed, each of said swing stirrup means having at least one horizontal pivotal shaft portion and a transverse load bearing portion always disposed below said horizontal pivotal shaft portion due to gravity, said horizontal pivotal shaft portion being positioned below and pivotally coupled to said chain means so as to be freely rotatable; and article guiding means for exerting at least one of horizontal force and a combination of horizontal and vertical force on said article comprised of guide members disposed at various locations along said conveyor path, at least one of said locations being the portion of said conveying path which is other than straight and horizontal, and shaped for guiding articles mounted on successively disposed swing stirrup means during conveyance of said articles to secure article conveyance along various paths having any configuration.

2. A chain-conveyor system according to claim 1, wherein said driving chain means is comprised of a single chain, and each swing stirrup means comprises a bar having two bends forming one pivotal shaft part at one extremity of the bar, a horizontal load-bearing part terminating at the other extremity thereof, and a vertical side part joining the load-bearing part to the pivotal shaft part, said pivotal shaft part being rotably supported by respective bearings mounted on links on one side of said chain, and said article guide means being comprised of a said guide rail provided in parallel to the chain and near but laterally clear of said other extremity of each swing stirrup means and disposed at a suitable height to prevent conveyed articles from falling laterally off the swing stirrup means.

3. A chain-conveyor system according to claim 2 in which, at a part of the conveyor path where the conveyed articles are to be unloaded from the conveyor, said side guide rail is removed, and an unloading guide rail is placed diagonally across the path of travel of the articles thereby to guide the articles laterally off the conveyor on the lateral side of said other extremity of each stirrup.

4. A chain-conveyor system according to claim 1 in which said driving chain means is comprised of two parallel spaced-apart chains provided at the lateral opposite sides of said conveyor path, and each swing stirrup means comprises a bar having four bends forming two pivotal shaft parts at the opposite extremities of the bar, a horizontal load-bearing part in the middle portion thereof, and two vertical side parts joining said load-bearing part to respective pivotal shaft parts, said pivotal shaft parts being rotatably supported by respective bearings mounted on links of the chain on respective sides.

5. A chain-conveyor system according to claim 1 in which said swing stirrup means are further provided on the other side of the chain to thereby provide two groups of swing stirrup means on respectively opposite sides of the chain in symmetrical configuration.

6. A chain-conveyor system according to claim 1 in which said article-guiding means comprises first guide members disposed substantially parallel to and spaced apart from the group of swing stirrup means in the conveyor at parts thereof other than horizontal path parts, thereby forming a passageway for conveyed articles between the guide members and the swing stirring means and second guide members disposed closely below the swing stirrup means to prevent conveyed articles from dropping through the spaces between adjacent swing stirrup means.

7. A chain-conveyor system according to claim 6 in which, at an intermediate point in an ascending vertical part of the conveyor path, there is provided an unloading station for unloading conveyed articles off the conveyor, said unloading station comprising an outlet formed in said guide member at said intermediate point and having a faired, smooth exit guide and a deflecting guide member functioning to deflect and cause ascending articles to tip outward and slide out along said exit guide.

8. A chain-conveyor system according to claim 6 in which, at an intermediate part in a vertical part of the conveyor path, there is provided an unloading device comprising a gate hinged along its upper edge and controllably operated to close and open an opening in said guide member and a movable guide plate disposed on the rear side of the conveyor opposite from the side of said guide member and adapted to be controllably moved from a retracted, inoperatibe position to an advanced, unloading position where the guide plate is pressed against the swing stirrups and into the conveyor path thereby to force an oncoming conveyed article off the conveyor and out through said opening in opened state, said gate being closed and said guide plate being in retracted position for pass-by conveying of the articles, and the gate being opened and the guide plate being moved into advanced position for unloading operation, said unloading device being operable for both ascending and descending operation of the conveyor.

9. A chain-conveyor system according to claim 8 in which said movable guide plate has a cissoidal shape as viewed in side view perpendicular to the direction of travel of the conveyor as is actuated to move between said retracted and advanced positions by power transmitted thereto from fluid motive power means through a linkage.

10. A chain-conveyor system according to claim 6 in which, at an intermediate part in a descending vertical part of the conveyor path, there is provided a loading device comprising a swinging chute hinged at a lower part thereof and controllably operated to close and open an opening in said guide member and a guide plate disposed on the rear side of the conveyor opposite from the side of said swinging chute, the swinging chute being closed for pass-by conveying of the articles and being opened for loading operation to receive an article and load the same onto the descending conveyor, said guide plate functioning as a backstop and guide.

11. A chain-conveyor system according to claim 6 in which, at an intermediate part in an ascending vertical part of the conveyor path, there is provided a loading device comprising a gate hinged along its upper edge and controllably operated to close and open an opening in said guide member, a horizontal conveying device for supplying articles to the swing stirrups of said vertical part of the conveyor path, and a movable guide plate disposed on the rear side of the conveyor opposite from the side of the guide member and adapted to be controllably moved from a retracted, inoperative position to an advanced, loading position where the guide plate backs up the swing stirrups thereby to assist the stirrups to intercept the articles thus supplied, said gate being closed and said guide plate being in retracted position for pass-by conveying of articles ascending from below and past the loading device, and the gate being opened and the guide plate being advanced for loading operation from said horizontal conveying device.

12. A chain-conveyor system according to claim 1 in which a swing-stirrup conveyor constitutes a driving and conveying means in an apparatus for receiving dumpable material at a first place and dumping the same at a second place, said apparatus comprising: said conveyor having a substantially horizontal upper span extending between first and second sprocket devices and covering the distance between said places and a lower return part; parallel rail tracks encompassing and conforming approximately with the lateral profile of said lower return part of the conveyor and parts thereof following periphery of said sprockets; and a plurality of trolleys each comprising a box-like container with one open side and wheels rotatably attached to the container on said open side for rollably supporting the container in upside-down attitude on said rail tracks with the open side facing the tracks, each trolley being intercepted and driven along said tracks by one of the swing stirrups until it is tipped upright at said first sprocket device onto said upper span of the conveyor to be loaded with said material at such first place and to be thus conveyed until it is tipped at said second sprocket device thereby to dump the material at said second place and to be guided by and ride again the rail tracks, the trolley then being again intercepted by a swing stirrup to repeat the above described process.

13. A chain conveyor system according to claim 1 in which two parallel spaced apart chains are provided at the lateral opposite sides of said conveyor path, and each swing stirrup comprises a substantially U-shaped member, said substantially U-shaped member being rotatably supported by respective bearings mounted on links of the chain on respective sides.

14. A chain conveyor system according to claim 13 wherein said substantially U-shaped member comprises a horizontal load bearing element, two vertical elements connected to said load bearing element at opposite sides thereof, and two pivotal shaft elements connected to said vertical elements and outwardly depending therefrom, each of said pivotal shaft elements being operatively connected to a different one of said two chains.

15. A chain conveyor system according to claim 14 further comprising at least one shock absorbing member operatively connected to each of said swing stirrups for absorbing impact and protecting the conveyed articles.

16. A chain conveyor system according to claim 14 further comprising at least one shock absorbing member operatively connected to each of said swing stirrups for absorbing impact and protecting the conveyed articles.

17. A chain-conveyor system according to claim 4 comprising an unloading device for unloading conveyed articles off the conveyor at a horizontal path part thereof, said unloading device comprising a guide ramp disposed below the conveyor and adapted to be controllably movable between a lowered, inoperative position where the ramp is clear of the conveyor and a raised, operative position where the upper part of the ramp causes oncoming swing stirrup means to swing back and upward to positions where the load-bearing parts thereof are slightly higher than the chains and the conveyed articles are thereby lifted above the chains and a guide plate disposed above the conveyor and the guide ramp and diagonally across the conveyor at a height where the guide plate is clear of the conveyed articles when the guide ramp is in its lowered position but deflects and guides the articles thus lifted off the conveyor.

18. A chain-conveyor system according to claim 1 in which the center of the load-bearing part of each swing stirrup means is disposed substantially vertically below the chain means with sufficient clearance therebetween for free accommodation of conveyed articles therebetween.

19. A chain-conveyor system according to claim 1 in which two parallelly spaced-apart chains are provided at the laterally opposite sides of the conveyor, and each swing stirrup comprises two pivotal shaft parts rotatably supported by respective bearings mounted on links of the chains on respectively opposite lateral sides and a swing stirrup structure including in at least one part thereof a shock-absorbing member for absorbing impact and protecting the conveyed articles.

20. A chain-conveyor system according to claim 1 in which a sprocket wheel guiding the lower end of an upper, vertical swing-stirrup conveyor is disposed at substantially the same height level as another sprocket wheel guiding the upper of a lower, vertical swing-stirrup conveyor, the two sprocket wheels having parallel axes and being spaced apart to permit passage of conveyed articles therebetween, and conveyed articles being transferred from one conveyor to the other by transfer means comprising a guide plate adapted to guide articles on one conveyor off the swing stirrups thereof and toward the swing stirrups of the other conveyor and a guide roller adapted to further guide the articles onto said other conveyor.

* * * * *